United States Patent [19]

Aubrey

[11] Patent Number: 5,065,292
[45] Date of Patent: Nov. 12, 1991

[54] APPARATUS FOR CONVERTING A LIGHT FIXTURE FROM INCANDESCENT TO FLUORESCENT

[76] Inventor: Truman R. Aubrey, 1472 Beaudry Blvd., Glendale, Calif. 91208

[21] Appl. No.: 521,848

[22] Filed: May 7, 1990

[51] Int. Cl.⁵ ............................................. F21S 7/00
[52] U.S. Cl. .................................. 362/260; 362/226; 362/410
[58] Field of Search ............... 362/216, 254, 260, 410, 362/217, 226

[56] References Cited

U.S. PATENT DOCUMENTS

| | | | |
|---|---|---|---|
| 4,241,386 | 12/1980 | Dooley | 362/216 |
| 4,318,160 | 3/1982 | Dooley et al. | 362/260 X |
| 4,723,002 | 2/1988 | Troen | 362/260 |
| 4,811,183 | 3/1989 | Guritz et al. | 362/260 X |
| 4,855,883 | 8/1989 | Spitz | 362/260 |
| 4,878,159 | 10/1989 | Blasdell et al. | 362/260 X |

Primary Examiner—Ira S. Lazarus
Assistant Examiner—Sue Hagarman
Attorney, Agent, or Firm—G. Donald Weber, Jr.

[57] ABSTRACT

An apparatus which is used to convert a conventional table lamp from use of ordinary incandescent light bulbs to use of energy saving fluorescent bulbs. The apparatus includes an adapted which securely receives a fluorescent bulb, is substantially tamper proof with regard to the light fixture, is security oriented to inhibit theft from the light fixture and is an easy to install, permanent retrofit apparatus. Also, an easily installed secure, theft-resistance ballast is provided.

17 Claims, 2 Drawing Sheets

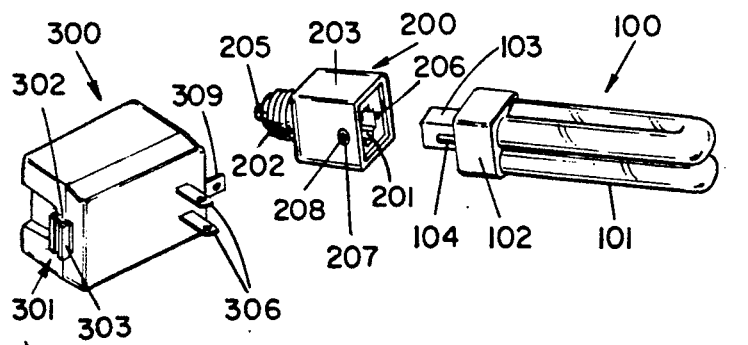
FIG. 1
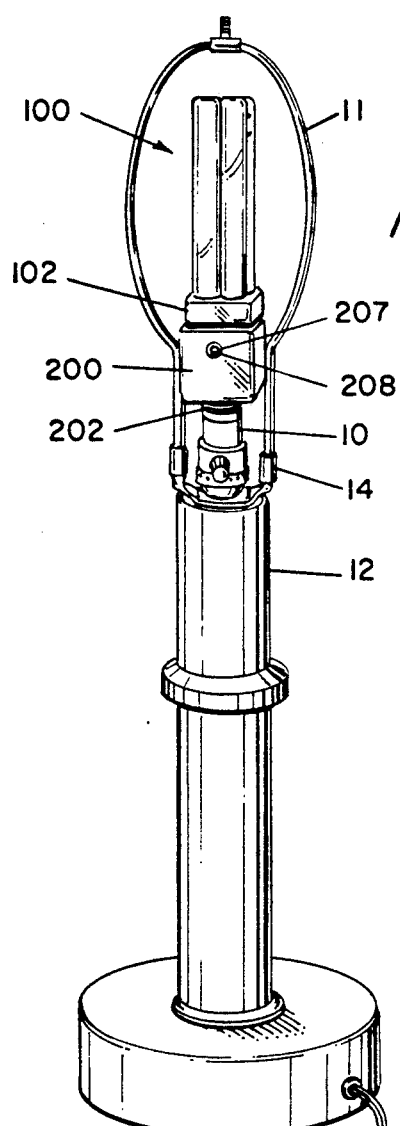
FIG. 2
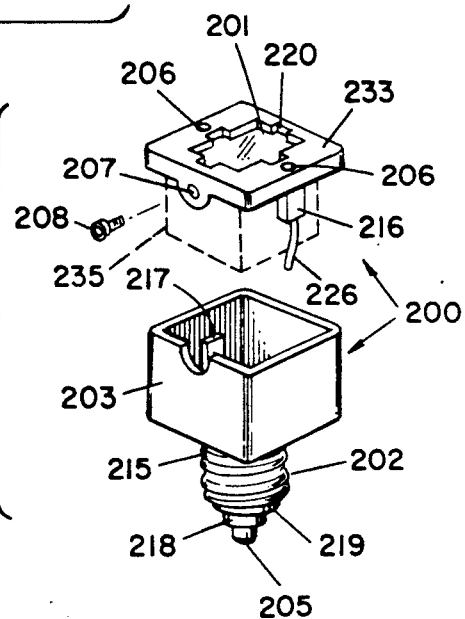
FIG. 3
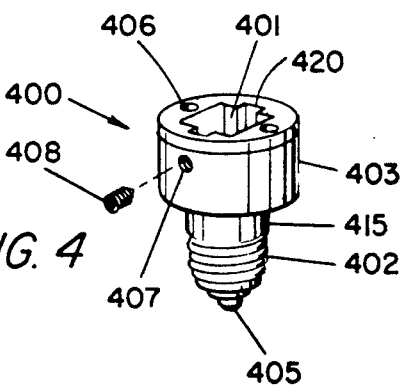
FIG. 4
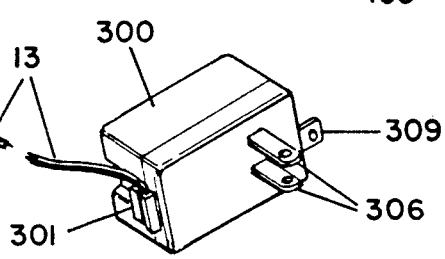

APPARATUS FOR CONVERTING A LIGHT FIXTURE FROM INCANDESCENT TO FLUORESCENT

BACKGROUND

1. Field of the invention

This invention is directed to a table lamp, in general, and to a conversion apparatus for converting the table lamp from incandescent operation to fluorescent operation, in particular.

2. Prior Art

Table lamps and other lighting fixtures are well known in the art. Fluorescent light fixtures are well known in the art, as well. In fact, there are some table lamps, known in the art, which use fluorescent light bulbs or tubes. However, any such devices are, generally, ready-built, rather expensive, and require total replacement of existing equipment which can be quite expensive.

The importance for converting from incandescent to fluorescent light fixtures is multi-faceted. For example, it is highly desirable to reduce the cost of electricity by converting from incandescent to fluorescent operation. In addition, the amount of heat generated by fluorescent light is substantially less than the heat generated by incandescent light bulbs of comparable lumens (or light generation). Consequently, the costs incurred in air conditioning and the like are significantly reduced when fluorescent lighting is used.

The cost reduction advantages are especially important in commercial establishments such as (but not limited to) hotels and motels. Most establishments, including commercial institutions such as those noted above, already have in existence a huge inventory of conventional fixtures, lamps or the like which utilize incandescent light bulbs. Thus, the payback cost of converting from incandescent to fluorescent operation becomes virtually prohibitive when all of the incandescent fixtures have to be replaced with new fluorescent table lamps or similar fixtures.

Consequently, it is highly desirable to convert these existing energy wasting incandescent table lamps to energy efficient fixtures or table lamps capable of fluorescent operation. By converting existing equipment, the requirement of buying all new table lamps on a replacement basis is avoided.

Furthermore, in commercial establishments, as noted above, it is frequently very important to prevent theft of or tampering with lighting fixtures and the like. For example, in the hotel/motel business it is considered routine to los lamps, bulbs, parts of lamps, or the like, on an on-going basis. This loss can be quite significant. Therefore, many approaches have been taken to minimize this theft or pilferage. Consequently, it is highly advantageous to provide a substantially theft-proof fluorescent adapter when converting existing table lamps from incandescent to fluorescent operation. A theft-proof, low cost, energy saving conversion apparatus which does not require a complete replacement of the existing table lamps is highly desirable.

PRIOR ART

Applicant has not conducted a formal search of the prior art. Various components shown and described in this application are known to be old. The combination of all of the parts is not known to exist as an entity or as a patented product. Most of the parts herein described are modified and improved variations of prior art components.

SUMMARY OF THE INVENTION

This invention is directed to an apparatus for converting an incandescent table lamp, or the like, to an energy saving fluorescent table lamp. In this description, by incandescent table lamp is meant a table lamp which uses incandescent bulbs. Conversely, by a fluorescent table lamp is meant a table lamp which uses fluorescent bulbs or tubes. Of course, the term "table lamp" is intended to include virtually any portable floor lamp, table lamp, wall sconce, swag lamp or the like that has an electrical cord and plug which is typically plugged into an electrical outlet to electrify the lamp.

The apparatus of the invention includes a adapter which includes a screw-base which is substantially similar to the conventional threaded "Edison-base". The threaded base may include a rachet mechanism to position the alignment of the fluorescent adapter and to prevent over-tightening.

The adapter includes a receptacle for receiving the plug-in end of a conventional single ended fluorescent tube or lamp. Although not limited thereto, the conversion can be from an incandescent bulb of 25 Watts through 100 Watts to a fluorescent bulb of 5 Watts through 28 Watts. The fluorescent lamps which are used comprise a parallel tube arrangement of the PL type and can include a multi-tube arrangement referred to as a "Quad" tube.

In addition, a remote ballast is provided. The plug connected to the on existing table lamp cord is cut off and the cord is inserted into a quick connect receptacle which is an integral part of a plug-in ballast unit.

BRIEF DESCRIPTION OF THE DRAWINGS

FIG. 1 is an exploded view of one embodiment of the apparatus of the instant invention.

FIG. 2 is an assembled view of the apparatus of the instant invention.

FIG. 3 is an exploded view of one embodiment of the adapter portion of the instant invention.

FIG. 4 is an oblique view of another embodiment of the adapter portion of the instant invention.

DESCRIPTION OF A PREFERRED EMBODIMENT

Figure 5:
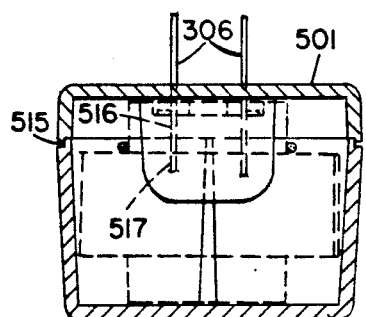
FIGS. 5 through 8 are several cross-sectional views of the ballast assembly of the instant invention.
Figure 6:
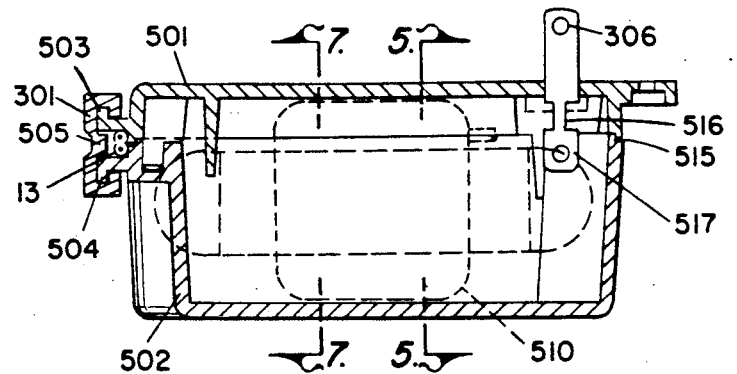
Figure 7:
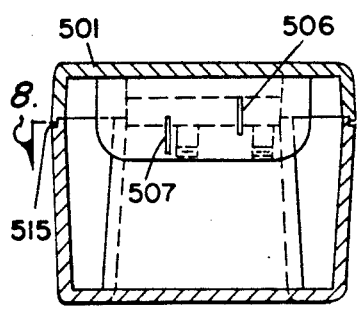
Figure 8:
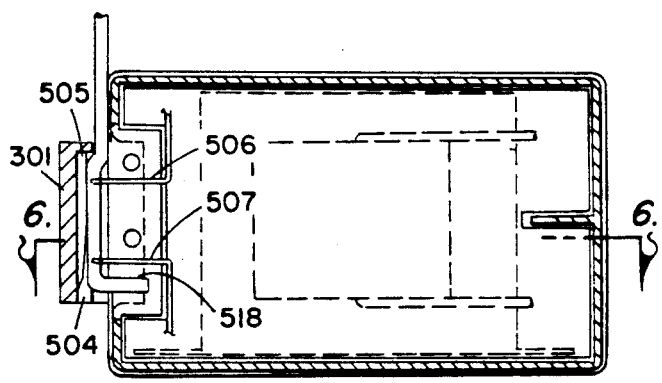

Referring now to FIG. 1, there is shown an exploded view of the major components of the instant invention. The apparatus includes a representative fluorescent lamp 100. In this embodiment, the fluorescent lamp comprises a plurality of tubes 101 connected to a base connector 102 which is configured to engage an adapter 200. The tubes 101 may take the form of U-shaped tubes or H-shaped tubes. Also, one or more tubes may be included in the lamp. All of the arms of the tubes are substantially parallel to each other. Two ends of each U-shaped (or H-shaped) tube 101 are mounted in the connector 102. The connector 102 includes a tongue 103 or elongated member, which, in the preferred instance, is rectilinear in shape. The tongue 103 extends from the bottom of the connector 102 and is intended to be insertable into an aperture 201 in the adapter 200. The tongue 103 snugly mates with the aperture 201 to afford a substantial purchase for the lamp 100. In addition, two or more electrodes 104 extend through the connector 102 and connect to the fluorescent tubes 101. Normally, the electrodes 104 are on opposite sides of the tongue 103. The electrodes 104 fit into and engage electrically conductive contacts 206 within the adapter 200. In addition, appropriate starter (or ignition) circuitry including a capacitor (not shown) and the like is usually mounted within the connector 102. In a typical arrangement, the starter circuitry is disposed within the tongue portion 103 of the connector 102.

The electrodes 104 in the lamp 100 are connected to the appropriate connections on the fluorescent tubes 101, per se, so as to apply the electrical potential thereacross which will ignite and maintain the light bulb activated.

Appropriate keys may be incorporated into the base connector 102 of the )amp 100 in order to properly align the lamp in the adapter. For example, the elongated tongue 103 can be appropriately configured so as to present a preferred engagement process between the lamp and the adapter.

The adapter 200 is specifically designed to accept fluorescent tubes and adapt same for insertion into standard screw-in receptacles for the "Edison" type base. Different configurations of adapter design are described infra. The adapter 200 includes a threaded base 202 which may be brass or other metal and is referred to in the industry as an "Edison socket" or "Edison base". The Edison base 202 is adapted to threadedly engage conventional light sockets in virtually any conventional lamp fixture. The base 202 is mounted on the adapter housing 203 which is fabricated of injection molded, high temperature, electrically insulating,. thermal plastic The housing may be a single, unitized structure, but is not limited thereto. The plastic housing 103 may be molded to have a threaded configuration thereon so that the brass base is threadedly engaged therewith. Alternatively, the brass base 202 can be form fitted or adapted to slip over the end of the housing 203.

The base 202 although not limited thereto, can be a ratchet base which is provided to prevent over-tightening of the bulb placed into the socket. This base also serves to align the assembly to clear the lamp harp so that the theft-inhibiting screw 208 can be accessed.

The bottom portion of the adapter 200 includes a first electrode 205 which protrudes through the middle-bottom of the housing 203. Electrode 205 is substantially identical to the bottom contact in an incandescent light bulb. The electrode 205 is adapted to contact the central electrical contact in the conventional socket. The electrode 205 is connected to one of the conductive contacts 206 mounted in the insulating housing 203. While not limited thereto, these contacts can take the form of split cylinders, anchored in housing 203, which snugly and resiliently receive the electrodes 104 from the fluorescent tube 100.

The base 202 is joined to another conductive contact 20 in the adapter 200. The brass base 202 is, obviously, the other electrical connector for the adapter 20 when mounted in the standard electrical receptacle.

Adjacent to the upper portion of the housing 203 there is provided a threaded aperture 207 which passes radially therethrough. A suitable tamper-resistant set screw 208 is provided in the threaded aperture. The set screw is adapted to be appropriately positioned so as to abut against, and securely engage, the elongated tongue 103 of the lamp base. Thus, the lamp 100 can be secured to the adapter 200 to prevent the inadvertent and/or unauthorized removal thereof.

In addition, as a further security measure, a suitable adhesive such as a lock-tight glue can be provided at the inner end of the socket base 202, for example, at the end of contact 205. This glue is applied prior to the insertion of the base into the receptacle. When the glue (or other suitable adhesive) sets, the adapter 200 is secured to the receptacle.

Thus, the lamp 100 is secured to the adapter 200 and the adapter 200 is secured to the light fixture. This arrangement provides a significant advantage in inhibiting theft of the lamp components for the commercial or institutional utilization noted above.

A ballast 300 is also provided. In a preferred embodiment, the ballast includes a "quick-wire" connection 301 as a part thereof. The connection 301 can be an external connector or it can be included integrally within the ballast housing, if so desired. The quick-wire connection 301 in the apparatus includes a slot 302 into which an ordinary lamp cord is inserted. A cover or slider device 303 is slidably mounted within the connection apparatus. The slider presses against the lamp cord 13 and cause electrical connections to be made thereto by means of two piercing prongs within the connector. Alternatively, the connector 301 can comprise a lever pivotally or rotatably mounted on the ballast, a set screw or the like built into or attached to the ballast or other means that allows the lamp cord to be quickly and easily connected to the ballast without the us of splices or the like.

Thus, the existing table lamp is altered by cutting the electrical plug off the lamp cord. (Alternatively, the plug can be disconnected from the lamp cord and the lamp cord can be cut in order to provide a clean end thereof.) In either event the lamp cord is substantially permanently attached to the connector 301 of the ballast 300.

The ballast assembly 300 includes prongs 306 which can be plugged into a typical wall outlet receptacle. The ballast 300 can be attached to the wall outlet by means of a tamper proof screw at mounting tab 309. Thus, the ballast 300 can be fixedly attached to the wall receptacle, the lamp wire is fixedly attached to the ballast 300, the adapter 200 is glued to the receptacle of the light fixture, and the fluorescent lamp 100 is secured to the adapter 200. Thus, the conversion apparatus is now operative to convert an ordinary incandescent lamp to a fluorescent lamp and, more particularly, a fluorescent lamp which is theft-inhibiting.

Referring now to FIG. 2, there is shown a fully assembled light fixture or lamp apparatus in accordance with the instant invention. In particular, a fluorescent lamp 100 is connected to the adapter 200. In this case, the fluorescent lamp is of the 28 Watts, 15 millimeter Quad-type. The base connector 102 is mounted to the adapter 200. As discussed relative to FIG. 1, the elongated tongue 103 (not shown in FIG. 2) is mounted within the aperture 201 in adapter 200. The set screw 208 is mounted in the aperture 207 and securely maintains the lamp 100 in position in adapter 200.

In addition, the screw base 202 of adapter 200 is inserted into a standard Edison-type socket 10. The socket is conventional in most lighting fixtures in the nature of table lamps, floor lamps or the like. A typical lamp harp 11 is joined to the lamp 12 by conventional clips and surrounds the fluorescent lamp 100 and adapter 200 assembly. The harp 11 is conventional and is utilized to mount a lampshade (not shown) to the lamp.

The lamp apparatus 12 includes a standard lamp cord 13 which has been attached to the ballast 300 by means of the quick-wire connection 301 as described above. That is, the lamp cord 13 has been inserted into the connection 301 and is, effectively, permanently affixed thereto. In addition, the lamp 12 may be bolted to the table (not shown), if desired.

The ballast 300, as noted, includes appropriate prongs (or tines) 306 which are adapted to be plugged into a standard wall outlet. In addition, the ballast 300 can be affixed to the wall outlet be means of a tamper proof screw or the like (not shown), which is connected to tab 309. Thus, apparatus 12 has been converted from incandescent to fluorescent operation in seconds with a minimum amount of effort and expense. Moreover, the significant capital investment in the lighting fixture, per se, has been retained.

Also, it is quite clear that a 100 Watts incandescent bulb can be replaced by a 28 Watts fluorescent lamp at significant savings in heat, energy, electrical costs and the like. Likewise, inasmuch as fluorescent lamps tend to have a greater lifetime than do incandescent bulbs, the cost savings in reduced maintenance are considerable.

Once the lamp 100 and adapter 200 have been assembled, they are mounted in the light fixture receptacle 10. The combined apparatus is, effectively, indistinguishable from the ordinary incandescent lamp when the lamp shade is applied to the light fixture.

Referring now to FIGS. 3 and 4, there are shown two adapters of different configurations. It is seen that adapter 400 shown in FIG. 4 is, essentially, round in configuration while adapter 200 shown in FIG. 3 (and in FIG. 1) is, essentially, rectilinear in configuration. These adapters have specialized shapes which are, basically, a function of the size of the fluorescent lamp which is utilized therewith. For example, the smaller, round-shaped adapter 400 is better suited for use with the 10 millimeter PL type fluorescent tube. Conversely, the larger rectilinear-shaped adapter 200 is better suited for the larger dual H-shaped, or 15 millimeter, lamp manufactured by Phillips and Panasonic.

For illustrative purposes, the appropriate light bulbs may be referred to as Osram Dulux bulbs, Phillips PL, and the like, which are of the 5, 7, 9 or 13 Watt characteristic. The 9 or 13 Watt bulb may take the form of a 9 or 13 Watt Quad bulb which is relatively shorter than a normal 9 or 13 Watt PL type bulb. These lamps are commonly referred to as 10 millimeter lamps. While there arte preferred or typical lamps known at this time, the lamps do not limit the scope of the instant invention, per se.

Referring now to FIG. 3, there is shown an exploded view of a generally rectilinear embodiment of the adapter 200 of the instant invention. The adapter 200 includes the housing 203 which may be, as noted, a unitized, one piece, injection molded, high temperature, thermal plastic housing. The housing 203 is substantially hollow an cubical in configuration.

The housing 203 includes a base 215 which extends from the bottom there The base 215 is generally cylindrical in configuration and is integral with the rectilinear housing 203. The brass base 202 is mounted to base 215 in any suitable fashion. For example, the base 215 can be threaded and the brass base 202 mounted threadedly thereto. Conversely, the base 215 can be cylindrical with the brass base 202 affixed thereto in an suitable fashion.

The end 218 of the base 215 extends beyond the end of the brass base 202. A conductor 206 passes through the end thereof and is connected to the contact 205 which may take the form of solder bead or the like. A separate contact base 219 is adapted to fit over the end 218 and to connect to the internal connections in the housing. A suitable contact, such as a solder bead or the like, is used to make this connection, as well.

The top portion 233 of the adapter 200 is formed to provide the aperture 201 to receive the lamp tongue 103 (see FIG. 1). In addition, appropriate support means 216 extend downwardly therefrom and provide the support for the contacts 206 which are adapted to receive the contact pins 104 of the fluorescent tube 100. The contacts can be connected to the base 202 by suitable wires 226 or the like.

The support means 216 mate with support structures 217 which include the connections between the contacts 206 and either the base contact 219 or the solder bead contact 205. A plurality of keyways 220 can be provided in order to establish the proper seating of the fluorescent tube 100 in the housing 200. The keyways can take any appropriate configuration.

In addition, the top portion includes the aperture 207 into which is threadedly engaged the set screw 208 which is adapted to maintain the fluorescent lamp within the housing. That is, set screw 208 is adjusted to bindingly abut against the tongue 103 of the fluorescent lamp and yet not be readily accessible except through aperture 207 and with a specialized Allen wrench or similar type tool.

The top portion 233 of the housing is selectively mounted onto the housing 203 and joined thereto by an appropriate joinder procedure such as sonic welding, appropriate adhesives or the like. As suggested by dashed outlines, the top portion 233 may include an inner housing 235. The inner housing 235 extends downwardly from the top portion 233 and nests with the housing 203.

Referring now to FIG. 4, there is shown a perspective view of the round adapter 400. This adapter has a construction which is similar to adapter 200 but has a round configuration in order to better interface with a smaller fluorescent tube, as described above. In addition, the round adapter 400 more easily engages many lamp fixtures which have narrow harps and the like. A contact 405 is provided at the end of the base. A brass or similar metal contact 402 is provided with a threaded configuration. The base 402 is mounted on the base extension 415 of the housing 403 which may also be fabricated in similar fashion to the housing 203. The contacts 406 are provided to engage the contacts 104 on the fluorescent tube. The aperture 401 is provided to receive and engage the tongue 103 of the fluorescent tube. Keyways 420 are provided for proper seating of the tube, if desired. Of course, with properly sized components, the ballast (or at least the ignition circuit and the related capacitors) can be mounted within the adapter housing.

Referring now to FIGS. 5 through 8, inclusive, there are shown partially broken-away, partially cross-sectional views of the remote ballast box 300 of the instant invention. The box 300 includes an upper portion 501 and a lower portion 502 which are selectively interlocked and joined together by appropriate adhesives such as sonic welding or the like. In addition, the upper portion 501 and lower portion 502 include an ear 503 and 504, respectively, which extends therefrom. These ears are adapted to be aligned when the ballast box is assembled.

A slider device 301 (see FIG. 1) is adapted to slideably engage the two ears in a slideable but locking arrangement. The slider 301 includes edges which engage and slide along the ears. The slider also includes a central ramp portion 505 which is tapered from the open front end to the closed rear end of the slider 301. Thus, as the slider moves along the ears, the tapered portion reduces the space between the ears (or lugs) and the slider device 301.

Typically, the lamp cord 13 is disposed in the space between the ears and pressed therein when the slider 301 is slid along the ears and the tapered portion diminishes the space therebetween. In other words, the tapered ramp portion pushes on the wires and pushes them against the sides of the ballast box.

Mounted in the ballast box are a pair of piercer points 506 and 507. The points extend beyond the exterior surface of the ballast box adjacent to the upper and lower ears, respectively. That is, the upper portion includes an ear 503 and a piercer point 506. Similarly, the lower portion 502 includes an ear 504 and a piercer point 507. When the ears are placed in the proper position, the two piercer points extend beyond the exterior of the ballast box and are displaced vertically from each other. Thus, when the lamp cord 13 is placed in the space between the ears and compressed by the slider 301, each piercer point pierces the insulated covering on a separate one of the pair of conductors and makes contact with the conductor. Thus, a quick, effective and efficient interconnection between the piercer points and the lamp cord is achieved.

A standard or conventional transformer 501 (shown in phantom outline) used for fluorescent ballast purposes is mounted inside the ballast box. The transformer includes at least two output terminals (not shown) which are connected to the respective piercer points and, thus, to the lamp cord in the slider mechanism.

In addition, the transfomer includes two input terminals (not shown) which are connected to the connection pads of connector prongs 306 which are mounted in and extend from the ballast box. The prongs 306 are adapted to be inserted into a conventional electrical outlet or wall socket (not shown) to make electrical connection therebetween. Thus, the electrical connection is completed from the connector prongs 306, through the transformer, through the piercer points, to the lampcord and, ultimately, to the fluorescent tube in the light fixture discussed above.

Typically, the ballast box is fabricated of a thermoplastics material in the form of a relatively deep bottom section 502 and a relatively shallow top section 501. The bottom and top sections interact at a joinder ledge which is adapted to be joined together with appropriate adhesives including but not limited to sonic welding. A transformer is mounted in the ballast box in a conventional and convenient manner with an epoxy resin or the like. Appropriate struts, abutments, bosses and the like are also provided within the ballast box for strength and for supporting the transformer.

In order to assure that the lamp cord does not disconnect from the ballast box, a groove or slot 518 may be provided in the edges of the ballast box portions. The free end of the lamp cord 13 is inserted therein, and the adjacent portion of the lamp cord can then be placed between the ears, as noted above. The slider 301 is adapted to lock to the ballast box by means of a snap fit which can be placed at the front end thereof. Alternatively, the slider can be mounted to the box by means of adhesives, glue, screws or the like.

The power prongs 306 can be properly shaped so as to be securely engaged within the walls of the ballast box. For example, a notch 516 can be provided in the prongs 306 to grip the ballast box. In the preferred embodiment, the power prongs 306 are mounted in and extend from the upper portion of the ballast box. The power prongs may be polarized as required under many electrical codes Moreover, the power prongs 306 are, typically, disposed at the opposite end of ballast box from the slider device 301. However, these details are generally design features, and are not specifically parts of the invention, per se.

Figure 12:
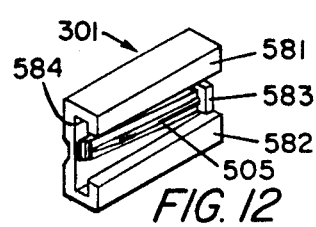
FIGS. 9 through 12 are various views of a wire connection device associated with the ballast assembly.
Figure 11:
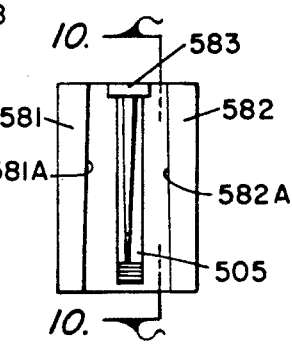
Figure 10:
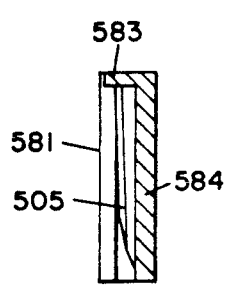
Figure 9:
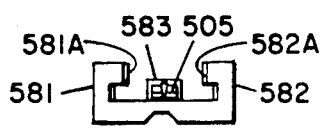

Referring concurrently to FIGS. 9 through 12, inclusive, there are shown various views of the slider device 301. In particular, FIGS. 9, 10 and 11 are end, cross-sectional and bottom plan views of the slider device 301. Similarly, FIG. 12 is an isometric view of the slider devicew 301. It is seen that the slider device includes a main back member 584 to which are connected a pair of arms 581 and 582. The arms 581 and 582 are formed at the edge of the back 584 and include portions which are reversed upon themselves to form a closure slot between the ends of the arms and the inner surface of the back 584. The central ramp 505 is tapered from the open front end to the closed back end of slider device 301. More particularly, the ramp 505 has the smaller end thereof at the open end of the slider device 301. The larger end of ramp 505 is at the closed end of device 301. The closed end of the device 301 is formed by a lip 583 which can be coextensive with the larger end of the ramp 505. Thus, the surfaces 581A and 582A are disposed adjacent to but spaced apart from each other to form, effectively, U-shaped arms at each edge of the slider device 301.

Figure 13:
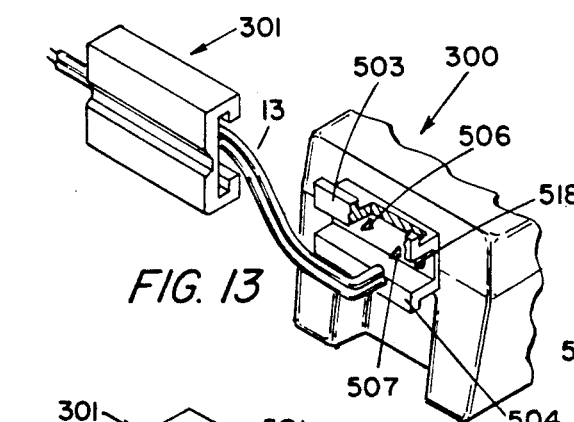
FIG. 13 is an exploded view of the wire connection device in conjunction with the ballast assembly.

Referring now to FIG. 13, there is shown an exploded view of the connector device 301 in conjunction with a portion of ballast box 300. In this instance, the end of wire 13 is cut and inserted into wire slot 518 in ballast box 300. The slider device 301 includes the U-shaped arms 581 and 582 as noted above. The U-shaped arms are adapted to slidably engage the outer edges of the ears 503 and 504. As the slider device 301 is caused to slide along the ears 503 and 504, the ramp 505 progressively presses against wire 301 which is disposed between the ears. As the slider 301 presses on wire 13, the wire engages the piercer points 506 and 507, as described above. The piercer points penetrate the outer covering of the conductors of the lamp cord 13 and make electrical contact therewith.

As noted above the rear lip 583 may engage and lock the slider device 301 to the connector device formed by the ears 503 and 504. On the contrary, the engagement may be completed by means of a force or friction set.

Thus, there is shown and described a unique design and concept of an apparatus for converting a table lamp from incandescent to fluorescent operation. The particular configuration shown and described herein relates to a table lamp, but other lighting fixtures are contemplated. While this description is directed to a particular embodiment of the invention, it is understood that those skilled in the art may conceive modifications and/or variations to the specific embodiments shown and described herein. For example, the magnetic or reactance ballast can be replaced with a solid-state ballast, a "high-power-factor" capacitor ballast, or the like. A solid-state ballast and/or power factor capacitors can be mounted in the ballast box or in the adapter assembly. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A retrofit light fixture conversion system comprising, a light fixture, said light fixture includes a lamp cord and a threaded socket for receiving a screw base of a light bulb, a fluorescent lamp, adapter means for mounting said fluorescent lamp in said light fixture, said adapter means includes a screw base which mates with said threaded socket, and ballast means connected to said lamp cord of said light fixture so that said fluorescent lamp is selectively rendered operable.

2. The system recited in claim 1 wherein, said ballast means is separate from said adapter means.

3. The system recited in claim 1 wherein, said fluorescent lamp has a base with an elongated tongue extending therefrom, and said adapter includes an aperture therein for receiving said elongated tongue of said fluorescent lamp.

4. The system recited in claim 3 wherein, said adapter includes electrodes arranged to be electrically connected to said fluorescent lamp.

5. The system recited in claim 4 wherein, said fluorescent lamp includes electrical contacts which engage said electrodes in said adapter means.

6. The system recited in claim 1 wherein, said ballast means includes magnetic reactance means.

7. The system recited in claim 1 wherein, said ballast means including connection means having a slot for receiving said lamp cord, and slider means slidably mounted to said connection means to retain said lamp cord within said slot.

8. The system recited in claim 7 wherein, said connection means includes a pair of piercer points which extend into said slot and selectively make electrical connection with said lamp cord.

9. The system recited in claim 7 wherein, said slider means includes a tapered portion which bears upon said lamp cord.

10. The system recited in claim 1 wherein, said fluorescent lamp includes a plurality of substantially parallel aligned tubes.

11. The system recited in claim 1 including, locking means for securing said fluorescent lamp to said adapter means.

12. The system recited in claim 1 wherein, said ballast means includes contact means for connecting to an electrical outlet.

13. The system recited in claim 1 wherein, said light fixture comprises a table lamp.

14. The system recited in claim 1 wherein, said adapter means has a substantially cylindrical configuration.

15. The system recited in claim 1 wherein, said adapter means has a substantially rectilinear configuration.

16. The system recited in claim 1 wherein, said threaded base of said adapter means includes an electrically conductive threaded contact portion.

17. A retrofit light fixture conversion system comprising, ballast means includes a ballast housing and magnetic reactance means mounted within said ballast housing, said ballast housing includes upper and lower housing units, connection means for connecting said ballast means to an electrical conductor means, said connection means includes a pair of ears, one of said ears mounted on said upper housing unit, one of said ears mounted on said lower housing unit, slider means, said slider means arranged to slidably engage said pair of ears, said connection means includes a pair of piercer points which extend from respective ones of said pair of ears and selectively make electrical connection with said electrical conductor means, and contact means for connecting said ballast means to an electrical outlet.

* * * * *